(12) United States Patent
Siluvainathan et al.

(10) Patent No.: US 9,959,125 B2
(45) Date of Patent: May 1, 2018

(54) FIELD UPDATE OF BOOT LOADER USING REGULAR DEVICE FIRMWARE UPDATE PROCEDURE

(71) Applicant: Samsung Electronics Co., Ltd., Suwon-si, Gyeonggi-do (KR)

(72) Inventors: Melky Siluvainathan, San Jose, CA (US); Truong Nguyen, San Mateo, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 78 days.

(21) Appl. No.: 14/932,956

(22) Filed: Nov. 4, 2015

(65) Prior Publication Data

US 2017/0039053 A1    Feb. 9, 2017

Related U.S. Application Data

(60) Provisional application No. 62/201,550, filed on Aug. 5, 2015.

(51) Int. Cl.
  *G06F 9/44*    (2006.01)
  *G06F 9/00*    (2006.01)
  *G06F 9/445*   (2018.01)

(52) U.S. Cl.
  CPC ............ *G06F 9/4401* (2013.01); *G06F 8/665* (2013.01)

(58) Field of Classification Search
  CPC ............. G06F 8/61; G06F 8/65; G06F 9/4401
  USPC ................................. 717/168–178; 713/1, 2
  See application file for complete search history.

(56) References Cited

U.S. PATENT DOCUMENTS

| | | | |
|---|---|---|---|
| 7,886,141 B2 | 2/2011 | Jan et al. | |
| 8,589,302 B2 | 11/2013 | Prakash et al. | |
| 8,719,585 B2 | 5/2014 | Grigor et al. | |
| 2003/0204843 A1* | 10/2003 | Barmettler | G06F 9/44526 717/178 |
| 2004/0199825 A1 | 10/2004 | Zeller et al. | |
| 2005/0060528 A1* | 3/2005 | Kim | G06F 12/1441 713/1 |
| 2005/0102669 A1* | 5/2005 | Marney | G06F 11/1004 717/174 |
| 2005/0229172 A1* | 10/2005 | Tu | G06F 8/65 717/168 |
| 2006/0248172 A1* | 11/2006 | Zurawka | G06F 8/665 709/220 |
| 2006/0259579 A1* | 11/2006 | Beverly | A63F 13/12 709/217 |

(Continued)

*Primary Examiner* — Qing Chen
(74) *Attorney, Agent, or Firm* — Renaissance IP Law Group LLP (57) ABSTRACT

Embodiments of the inventive concept include a boot loader update firmware (305), a system and method for producing the boot loader update firmware (305), and a method for using the boot loader update firmware (305) to update a boot loader module (160) in a device (110, 205, 210, 215). The boot loader update firmware (305) can include logic (310) to install firmware (315) in non-volatile memory (145). The firmware (315) can include a binary image (320) of the updated boot loader module (160). When the device (110, 205, 210, 215) is rebooted, the firmware (315) is activated, which can then copy the binary image 320) into non-volatile memory (150). When the device (110, 205, 210, 215) is rebooted again, the updated boot loader module (160) is activated.

15 Claims, 11 Drawing Sheets

(56) References Cited

U.S. PATENT DOCUMENTS

| | | | |
|---|---|---|---|
| 2007/0022328 A1* | 1/2007 | Tarra | G06F 11/1433 714/100 |
| 2009/0282402 A1* | 11/2009 | Allocca | G06F 8/61 717/176 |
| 2012/0124568 A1* | 5/2012 | Fallon | G06F 9/4446 717/169 |
| 2012/0210115 A1* | 8/2012 | Park | H04L 9/3242 713/2 |
| 2013/0074060 A1* | 3/2013 | Kim | G06F 9/485 717/168 |
| 2013/0201015 A1* | 8/2013 | Breed | G08B 29/02 340/501 |
| 2014/0136826 A1 | 5/2014 | Paek | |
| 2014/0325496 A1* | 10/2014 | Son | G06F 8/65 717/168 |
| 2014/0351569 A1* | 11/2014 | Durand | G06F 8/65 713/1 |
| 2015/0169837 A1* | 6/2015 | Guthrie | G06F 19/3412 204/406 |
| 2016/0085538 A1* | 3/2016 | Finch | G06F 8/665 717/172 |

\* cited by examiner

FIELD UPDATE OF BOOT LOADER USING REGULAR DEVICE FIRMWARE UPDATE PROCEDURE

RELATED APPLICATION DATA

This application claims the benefit of U.S. Provisional Patent Application Ser. No. 62/201,550, filed Aug. 5, 2015, which is hereby incorporated by reference.

FIELD

This inventive concept relates to device update, and more particularly to updating a boot loader in a device.

BACKGROUND

The boot loader is a relatively small piece of firmware in microprocessor/controller-based electronic devices, which initializes the platform, loads the device firmware into the processors, and initiates the processors to run with the loaded firmware. The boot loader is usually stored in persistent memory like Electrically Erasable Programmable Read-Only Memory (EEPROM) at the manufacturing facility and is not meant for frequent updates or field updates.

At times, it might be necessary to update the boot loader when issues are found during field usage. For example, the device might be capable of supporting new features, but those new features require a new boot loader be installed in the device. Or an error might have been discovered in the older boot loader, necessitating its replacement. Usually updating the boot loader requires shipping the device back to a service facility or manufacturing facility because updating the boot loader is a critical process: if the boot loader replacement is not performed and monitored properly, it could "brick" the device (that is render the device completely inoperative). In addition, device manufacturers often consider the methods used to update the boot loader to be confidential, and do not want others learning how the device boot loader is updated.

A need remains for a way to improve how to update device boot loaders.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept provide a viable option to update the boot loader in the field by the customer. The customer can download a special firmware using the regular device firmware upgrade method. ("Download" in this context can refer to downloading content from a website off the Internet, accessing content from another source, such as a USB key, CD-ROM, or DVD-ROM, or any other ways to access content.) This special firmware can perform the boot loader update and monitor the process. Since this process is performed by the firmware, the boot loader image as well as the method to update is also hidden.

The boot loader image can be embedded with the special firmware, called boot loader update firmware, which has additional intelligence to update the boot loader and monitor the process. This monolithic firmware image can be signed with an authentication key for security. This firmware image can then be updated into a device firmware partition using the firmware update procedure. Rebooting the device allows the boot loader update firmware to execute, which can then read the boot loader image from the firmware partition and can replace the old boot loader image in non-volatile memory and post the status. If necessary, the device firmware can then be upgraded to any preferred version using the firmware update procedure.

Figure 1:
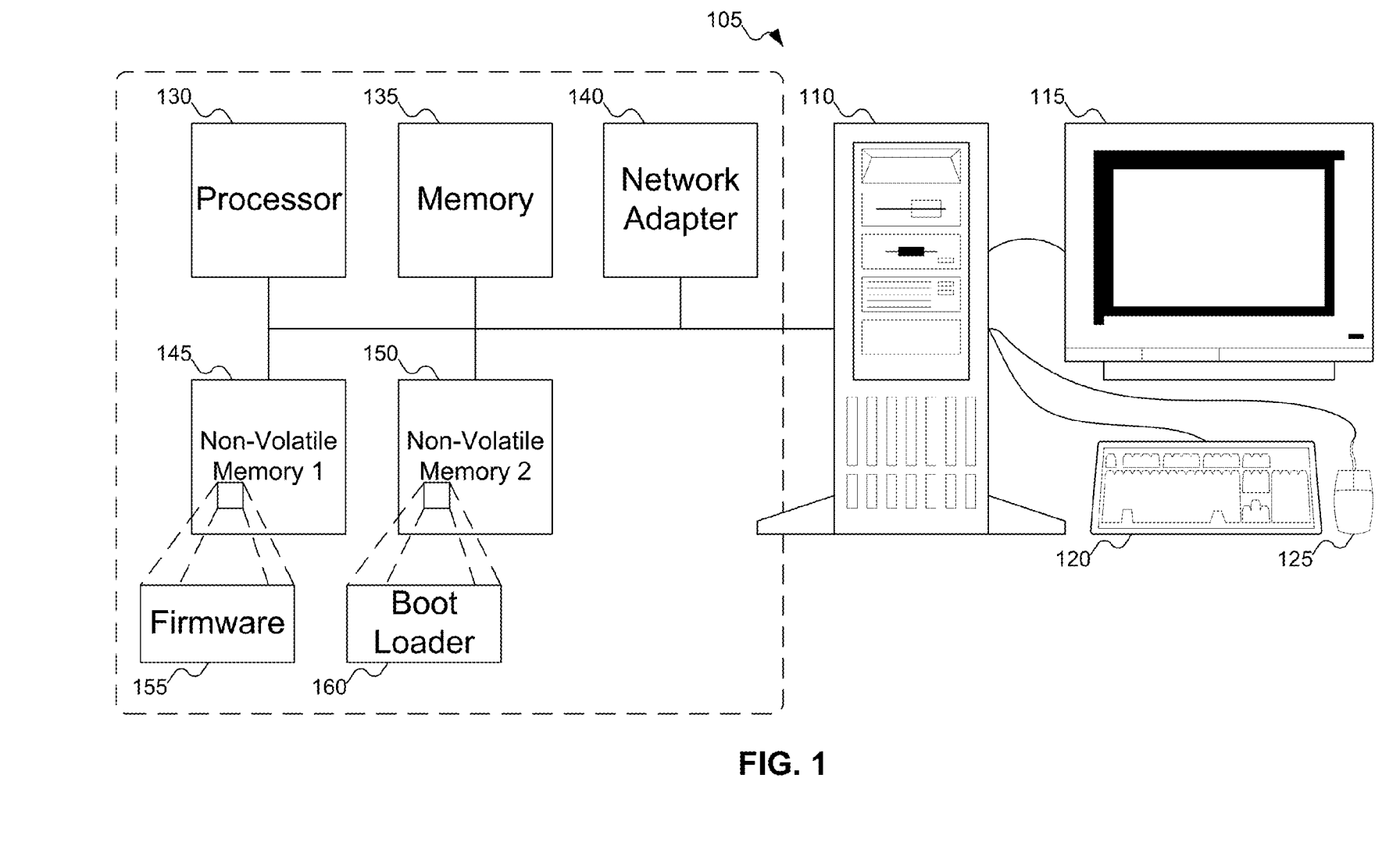
FIG. 1 shows a device equipped to update a boot loader, according to an embodiment of the inventive concept.

FIG. 1 shows a device equipped to update a boot loader, according to an embodiment of the inventive concept. In FIG. 1, computer system 105 is shown. Computer system 105 is shown as including computer 110, monitor 115, keyboard 120, and mouse 125. But a person skilled in the art will recognize that computer system 105 can include other components not shown: for example, other input/output devices, such as a printer, can be included. In addition, computer system 105 can include conventional internal components such as one or more central processing units 130, memory 135, network adapter 140 (which can be used to connect to a network (not shown) and download the boot loader update firmware), and so on. A person skilled in the art will recognize that computer system 105 can interact with other servers and/or computer systems, either directly or over any type of network: for example, Local Area Network (LAN), Wide Area Network (WAN), Virtual Private Network (VPN), or Internet. To enable communication over such a network, computer system 105 can include a transmitter/receiver (not shown in FIG. 1), which can transmit and receive data.

Figure 2:
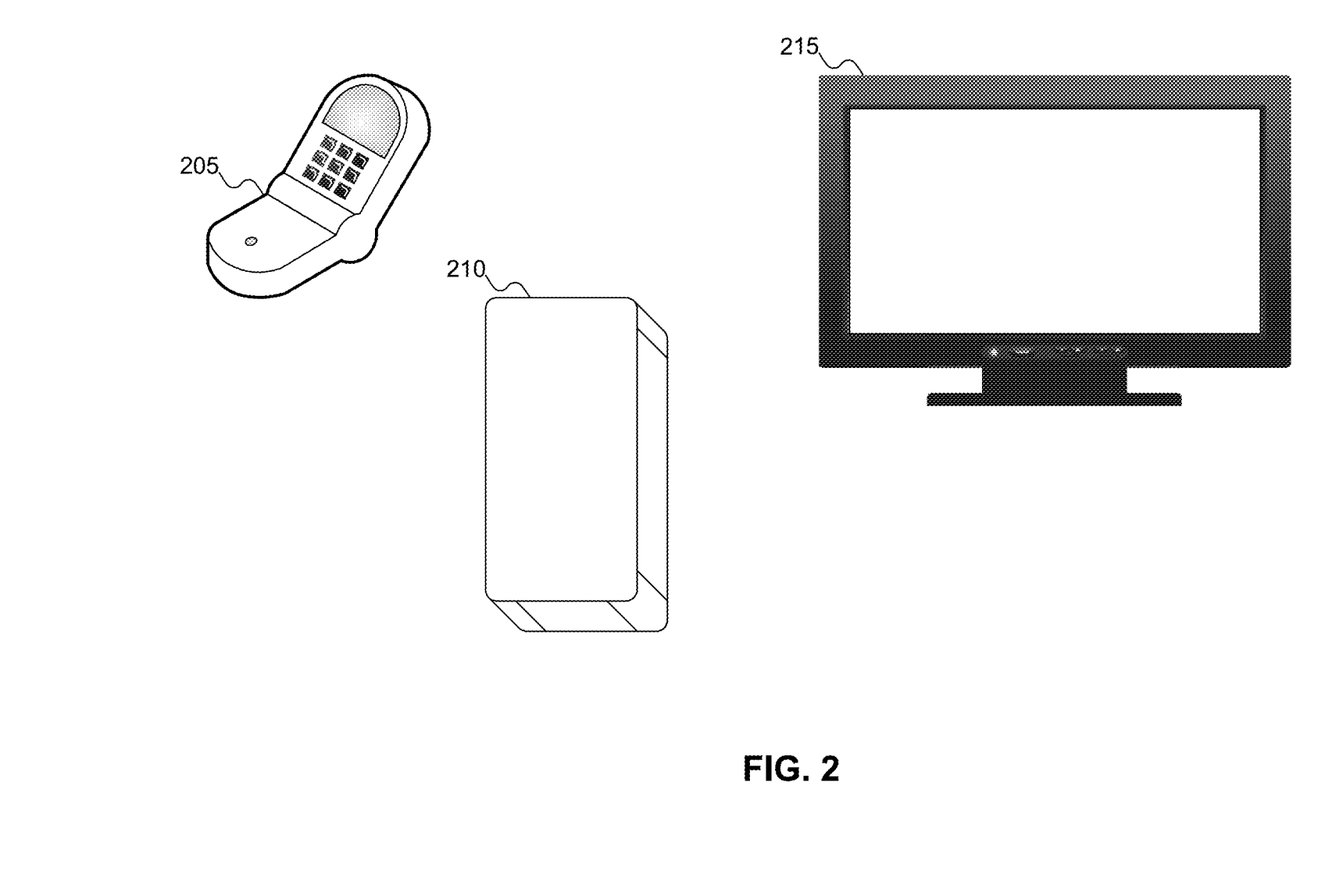
FIG. 2 shows alternative devices that can have boot loaders updated, according to alternative embodiments of the inventive concept.

Although FIG. 1 shows computer system 105 as a conventional computer system, a person skilled in the art will recognize that computer system 105 can be any type of machine or device, including, for example, a desktop computer, a laptop computer, a tablet computer, a personal digital assistant (PDA), or a smart phone, among other possibilities. FIG. 2 shows example alternative devices that can have boot loaders updated, according to alternative embodiments of the inventive concept. In FIG. 2, example alternative devices can include cellular telephone 205 (which can be a smart phone), medical device 210 (which can be, among other possibilities, a medical device that can be measure a person's temperature, blood pressure, pulse, and/or oxygen saturation, an electrocardiogram (ECG or EKG), or an electroencephalogram (EEG)), and/or television 215 (which can be any variety of television that can support field update of a boot loader module). Other devices that can include updateable boot loader modules can include other person electronics devices, such as Blu-Ray™ disc player. (Blu-ray is a trademark of the Blu-ray Disc Association.)

Returning to FIG. 1, computer 110 can include conventional internal components, such as processor 130 and memory 135. Computer 110 can also include other conventional components not shown in FIG. 1, such as a CPU system bus, PCI and/or other daughterboard slots, and so on. Computer 110 can also include non-volatile memories 145 and 150, which can store firmware 155 and boot loader 160. Although FIG. 1 shows non-volatile memories 145 and 150 as separate elements, embodiments of the inventive concept can use the same non-volatile memory to store both firmware 155 and boot loader 160. Non-volatile memories 145 and 150 can be any desired form of non-volatile memory, including among other possibilities Programmable Read-Only Memory (PROM), Erasable Programmable Read-Only Memory (EPROM), Electrically Erasable Programmable Read-Only Memory (EEPROM), flash memory, ferroelectric Random Access Memory (FRAM), phase-change memory, and magnetoresistive Random Access Memory (MRAM).

Figure 3:
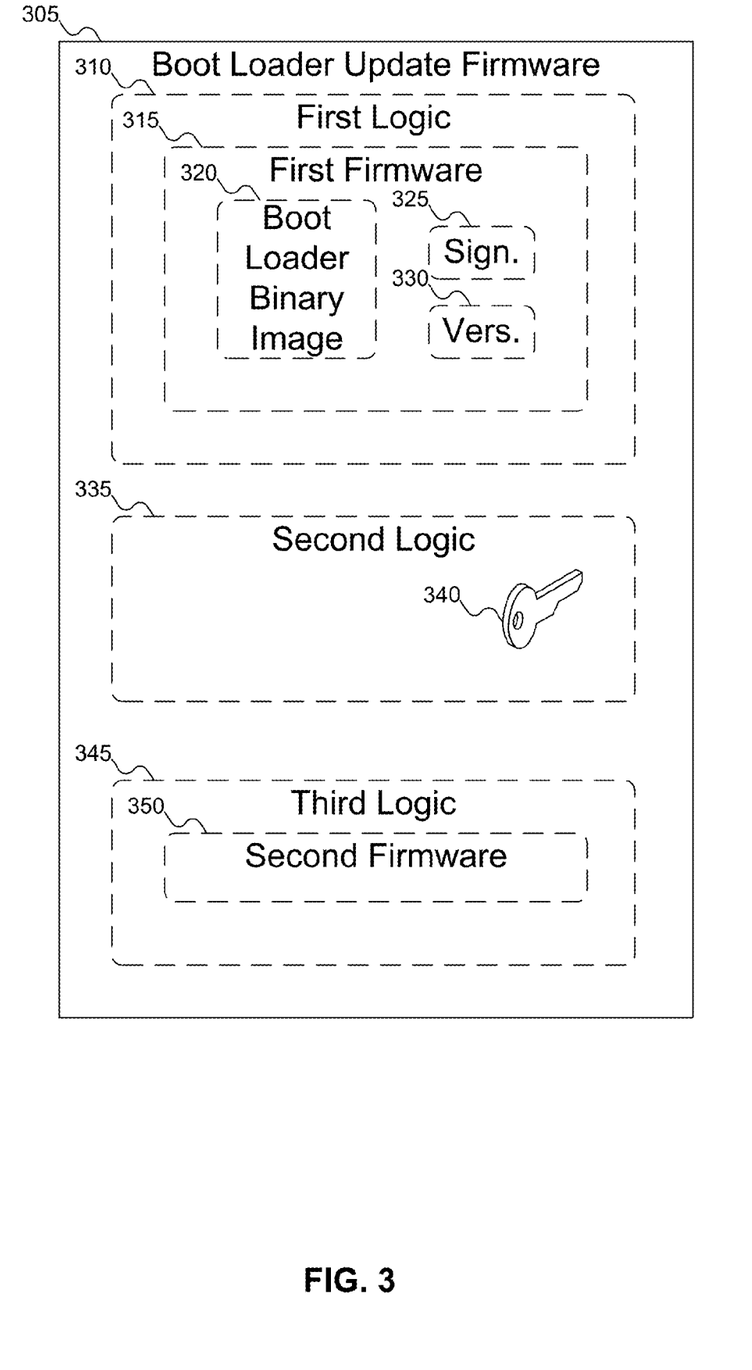
FIG. 3 shows details of a boot loader update firmware that can be used with the devices of FIGS. 1-2, according to an embodiment of the inventive concept.

FIG. 3 shows details of a boot loader update firmware that can be used with the devices of FIGS. 1-2, according to an embodiment of the inventive concept. In FIG. 3, boot loader update firmware 305 is shown. Boot loader update firmware 305 represents a firmware that can be used to update boot loader 160 of FIG. 1 with a new boot loader. To achieve this result, boot loader update firmware 305 can include first logic 310. When boot loader update firmware 305 is executed by the user, first logic 310 can install first firmware 315 in non-volatile memory 145 of FIG. 1. Once first firmware 315 is installed in non-volatile memory 145 of FIG. 1 and computer system 105 is rebooted (to load the new firmware), first firmware 315 can be executed by computer system 105 to achieve the installation of the new boot loader. Typically, firmware 155 is read from non-volatile memory 145 after computer system 105 is cold-booted; but as all that is required is for first firmware 315 to be read from non-volatile memory 145 and executed, if first firmware 315 is read from non-volatile memory 145 in other circumstances, a cold-boot of computer system 105 might not be required.

First firmware 315 can include boot loader binary image 320. Boot loader binary image 320 can be a binary image of the new boot loader module. When first firmware 315 is executed, first firmware 315 can copy boot loader binary image 320 into non-volatile memory 150 of FIG. 1, thereby replacing boot loader 160 of FIG. 1. Then, when computer system 105 of FIG. 1 is booted in a manner that reads boot loader 160 of FIG. 1 from non-volatile memory 150 of FIG. 1 (again, typically via a cold-boot of computer system 105, but other circumstances might suffice to cause boot loader 160 to be read from non-volatile memory 150 of FIG. 1), the new boot loader can be executed. And because boot loader binary image 320 is a binary image, the contents of the boot loader module are protected from casual inspection, keeping the code of the boot loader module secret.

First firmware 315 can also include other information, such as signature 325 and version 330. Signature 325 can be used to verify that the correct boot loader update firmware 305 has been used. For example, signature 325 can be generated using an authentication key specific to the manufacturer of computer 110 of FIG. 1 to prevent third parties from installing their boot loader modules into non-volatile memory 150 of FIG. 1. Signature 325 can also be generated from even more specific authentication keys. For example, the authentication key used to generate signature 325 can be specific to the client that owns computer system 105 of FIG. 1. In such an embodiment of the inventive concept, a boot loader update firmware 305 generated for another client would not work to install a boot loader module in non-volatile memory 150 of FIG. 1.

Version 150 can be used to verify that the correct version of boot loader module 160 of FIG. 1 has been installed in non-volatile memory 150 of FIG. 1. The use of version 330 is discussed further below with reference to FIGS. 7A-7D.

In some embodiments of the inventive concept, boot loader update firmware 305 can also include second logic 335. Second logic 335 can be used in conjunction with signature 325 to verify that an authenticated version of the boot loader module is installed in non-volatile memory 150 of FIG. 1 in computer system 105 of FIG. 1. To achieve this result, second logic 335 can include authentication key 340. For example, second logic 335 can use authentication key 340 to generate a second signature and compare that second signature with signature 325. If the two signatures match, then signature 325 is authentic and installation of boot loader binary image 320 can proceed; otherwise, signature 325 is improper and installation of boot loader binary image 320 can be aborted. While FIG. 3 shows second logic 335 as distinct from first logic 310, in some embodiments of the inventive concept first logic 310 and second logic 335 can be combined into a single logic.

In some embodiments of the inventive concept, boot loader update firmware 305 can also include third logic 345. Third logic 345 can include second firmware 350 to be stored in non-volatile memory 145 of FIG. 1 after first firmware 315 has copied boot loader binary image 320 into non-volatile memory 150 of FIG. 1 (as firmware 155 of FIG. 1 would have been replaced with first firmware 315 to achieve the update of boot loader 160 of FIG. 1). In other embodiments of the inventive concept, third logic 345 can download second firmware 350 from the manufacturer, which can then be installed in non-volatile memory 145 of FIG. 1.

Figure 4:
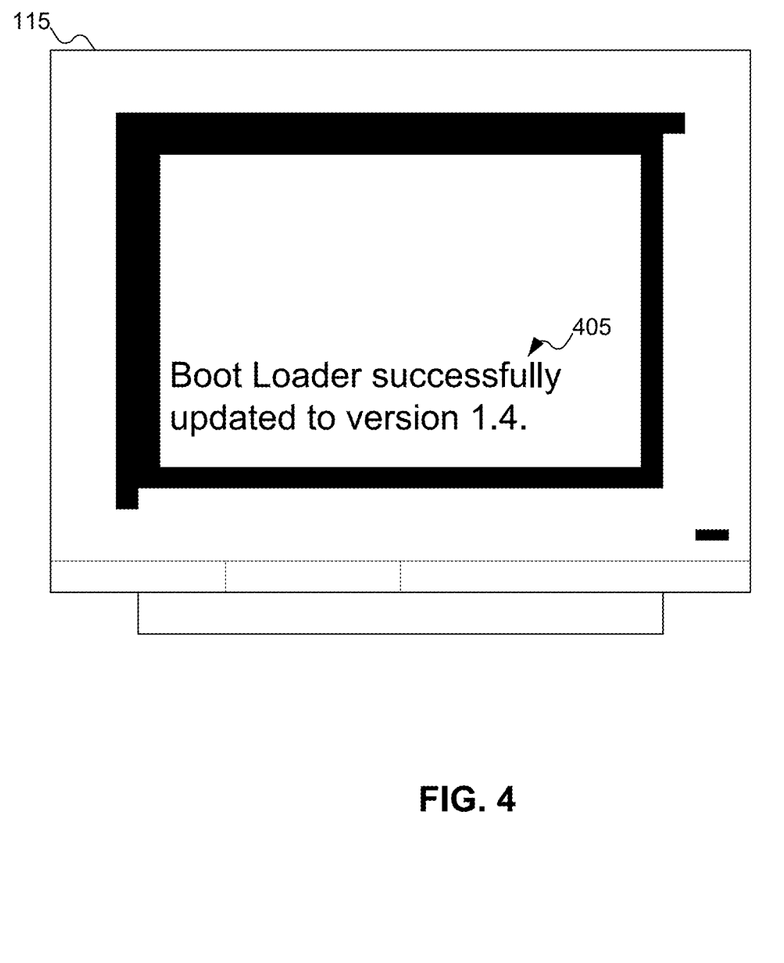
FIG. 4 shows the monitor of FIG. 1 posting a result of the operation of the boot loader update firmware of FIG. 3 on the device of FIG. 1, according to an embodiment of the inventive concept.

FIG. 4 shows monitor 115 of FIG. 1 posting an example message of a result of the operation of boot loader update firmware 305 of FIG. 3 on the device of FIG. 1, according to an embodiment of the inventive concept. In FIG. 4, result 405 shows that the boot loader of computer 110 was successfully updated to version 1.4. Other exemplary messages can include informing the client that the boot loader update has failed, and that the client should contact the manufacturer of computer 110 for assistance.

Note that while FIG. 4 shows monitor 115 of FIG. 1 displaying result 405 for an update of the boot loader of computer 105 of FIG. 1, the device can display result 405 directly, if it can support such a message. For example, device 210 of FIG. 2 might include a built-in display on which information can be presented, such as result 405. For devices without display capability, it might not be possible to display result 405, or result 405 might require using a code rather than a textual display. For example, the device might include a light (such as on a backlit button) that can be flashed on and off to indicate result 405. One way in which such a device can indicate a result is to do nothing if the boot loader update is successful, and flash such a light a certain number of times to indicate that the boot loader update was not successful.

Figure 5:
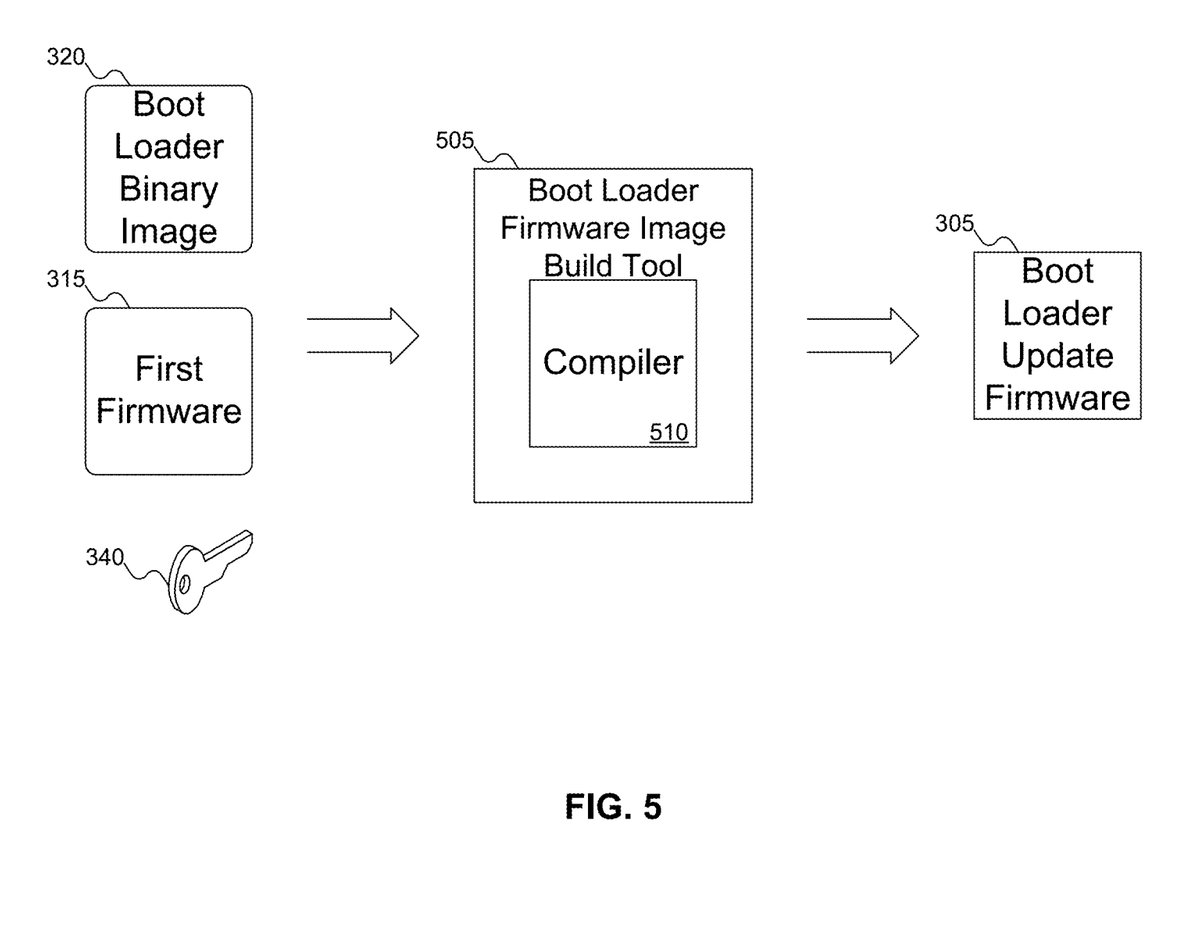
FIG. 5 shows a boot loader firmware image build tool capable of producing the boot loader update firmware of FIG. 3 for use with the devices of FIGS. 1-2, according to an embodiment of the inventive concept.

FIG. 5 shows a boot loader firmware image build tool capable of producing boot loader update firmware 305 of FIG. 3 for use with the devices of FIGS. 1-2, according to an embodiment of the inventive concept. In FIG. 5, boot loader firmware image build tool 505 can receive as input the needed elements, such as boot loader binary image 320, first firmware 315, and authentication key 340 (if used). Boot loader firmware image build tool 505 can use compiler 510 to combine these elements to produce boot loader update firmware 305. For example, boot loader firmware image build tool 505 can generate a signature for boot loader binary image 320 using authentication key 340, store boot loader binary image 320 and authentication key 340 in the appropriate places within first firmware 315 (or second firmware 340, if verification of the signature is handled by a separate logic), and produce boot loader update firmware 305 as the result.

Figure 6:
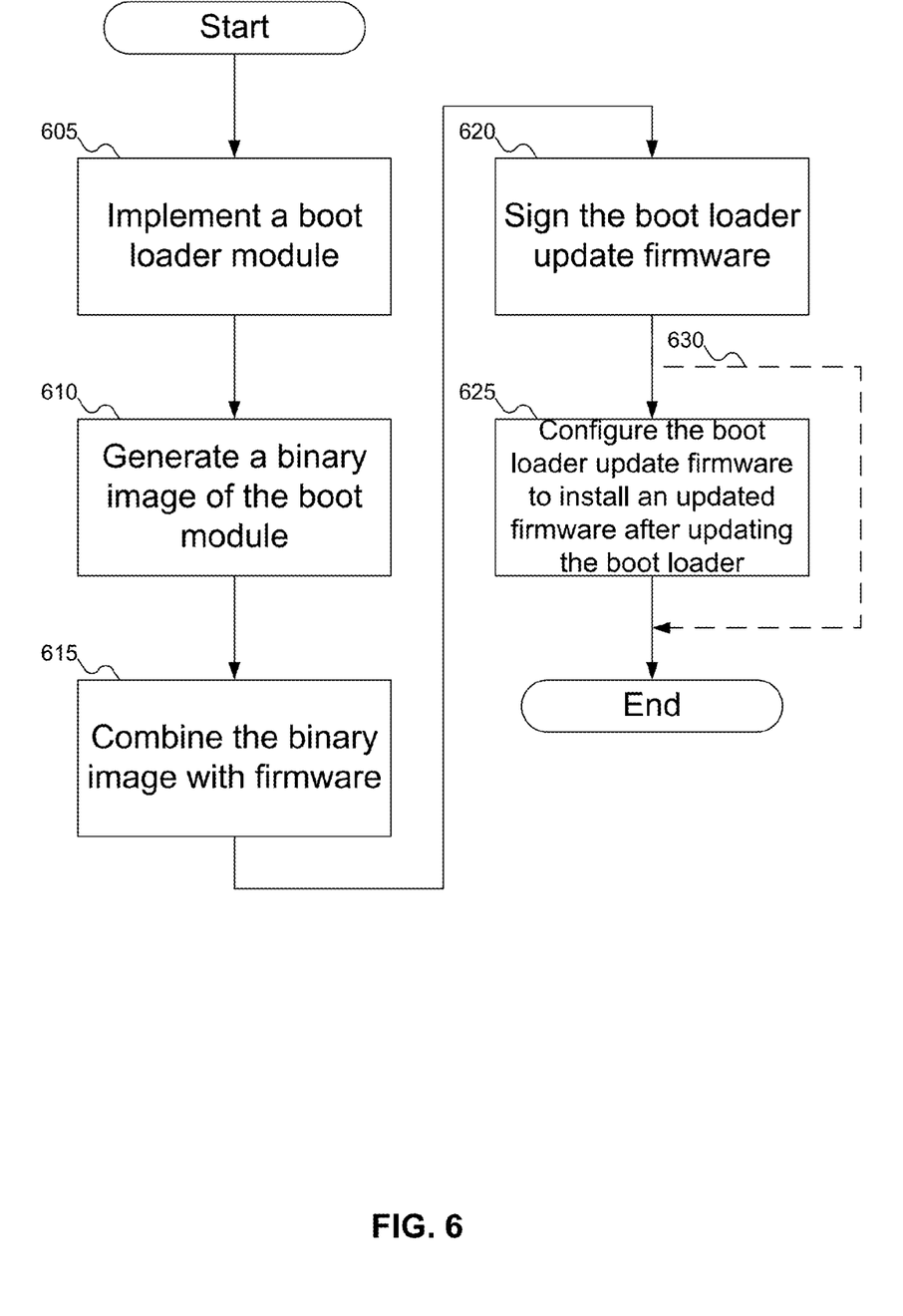
FIG. 6 shows a flowchart of a procedure for using the boot loader firmware image build tool of FIG. 5 to produce the boot loader update firmware of FIG. 3, according to an embodiment of the inventive concept.

FIG. 6 shows a flowchart of an exemplary procedure for using boot loader firmware image build tool 505 of FIG. 5 to produce boot loader update firmware 305 of FIG. 3, according to an embodiment of the inventive concept. At block 605, boot loader module 160 of FIG. 1 can be implemented. Different parties can be responsible for implementing boot loader module 160 FIG. 1 in different embodiments of the inventive concept. In some embodiments of the inventive concept, boot loader module 160 FIG. 1 can be programmed by programmers; in other embodiments of the inventive concept, boot loader module 160 FIG. 1 can be developed using automated software (which can be guided by data prepared by developers, possibly using data about the device in question). At block 610, binary image 320 of FIG. 3 of boot loader module 160 FIG. 1 can be generated. Binary image 320 can be generated in any desired manner: for example, by creating executable code from source code. At block 615, binary image 320 can of FIG. 3 combined with first firmware 315 to produce boot loader update firmware 305 of FIG. 3. At block 620, boot loader update firmware 305 of FIG. 3 can be signed using authentication key 340 of FIG. 3. At block 625, boot loader update firmware 305 of FIG. 3 can be configured to install an updated firmware after boot loader module 160 of FIG. 1 has been updated. In some embodiments of the inventive concept, this firmware update can be accomplished by firmware 315 of FIG. 1 downloading the updated firmware and storing it in non-volatile memory 145 of FIG. 1 after boot loader module 160 of FIG. 1 is updated. In other embodiments of the inventive concept, boot loader update firmware 305 of FIG. 3 can include third logic 345 of FIG. 3, which can install second firmware 350 of FIG. 3 after boot loader module 160 of FIG. 1 is updated. Block 625 can be omitted, as shown by dashed line 630.

In FIG. 6 (and in the other flowcharts below), one embodiment of the inventive concept is shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Figure 7A:
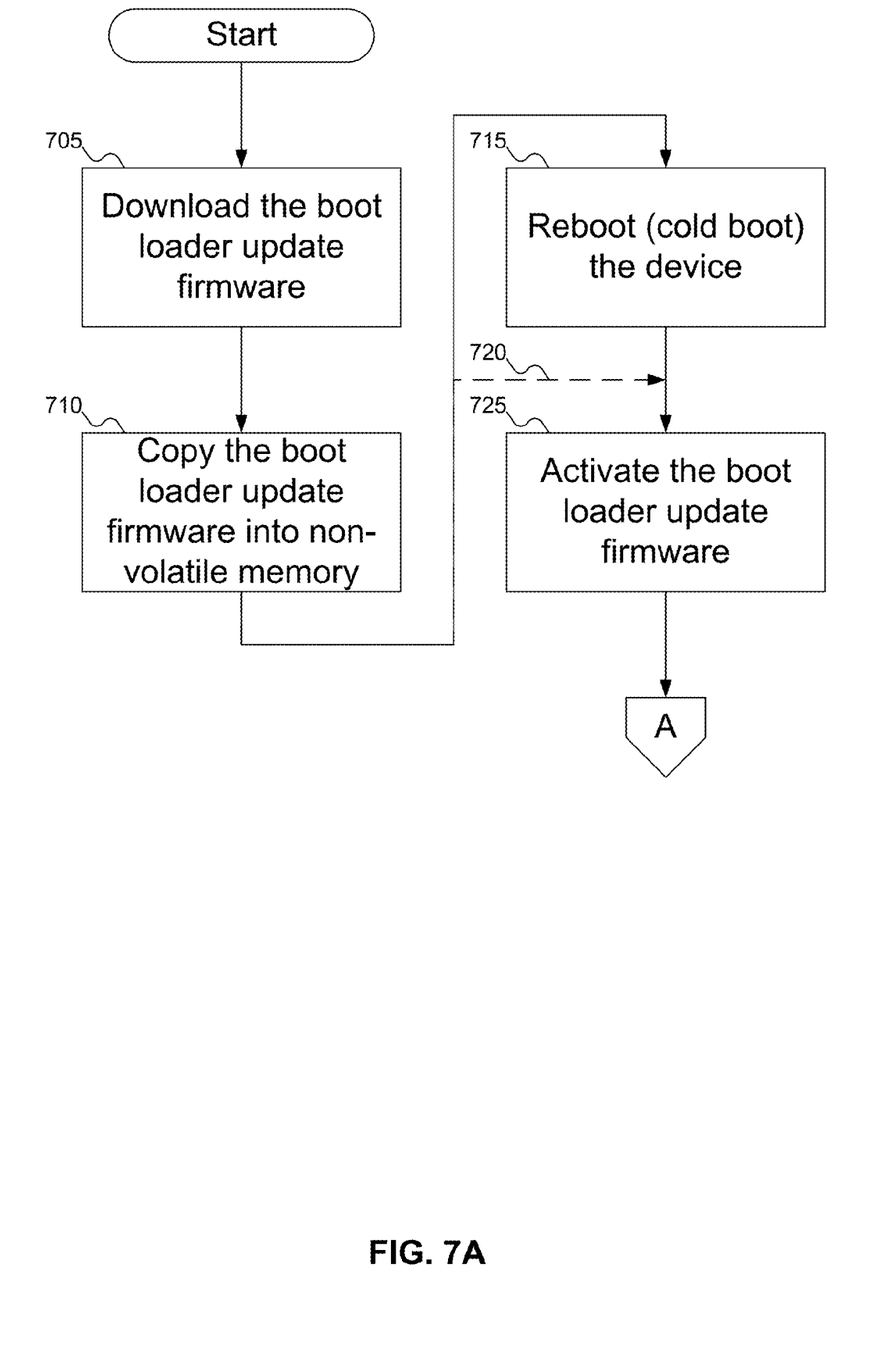
FIGS. 7A-7D show a flowchart of a procedure for using the boot loader update firmware of FIG. 3 to update the boot loader of the devices of FIGS. 1-2, according to an embodiment of the inventive concept.
Figure 7B:
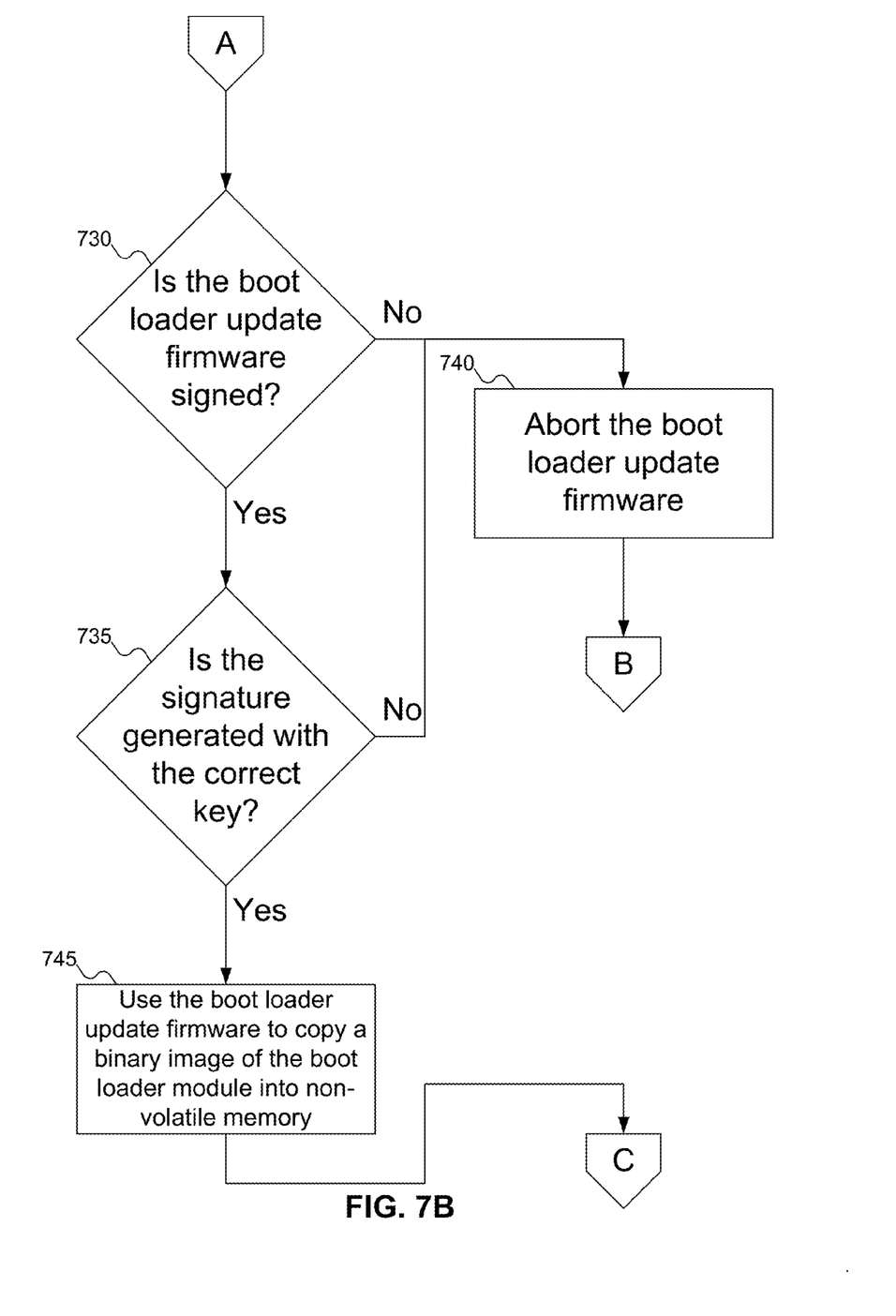

FIGS. 7A-7D show a flowchart of an exemplary procedure for using boot loader update firmware 305 of FIG. 3 to update boot loader module 160 of FIG. 1 of the devices of FIGS. 1-2, according to an embodiment of the inventive concept. In FIG. 7A, at block 705, devices 110, 205, 210, and/or 215 of FIGS. 1-2 can download boot loader update firmware 305 of FIG. 3 (for example, at the instruction of the client). At block 710, devices 110, 205, 210, and/or 215 of FIGS. 1-2 can copy boot loader update firmware 305 of FIG. 3 into non-volatile memory 145 of FIG. 1. At block 715, devices 110, 205, 210, and/or 215 of FIGS. 1-2 can be rebooted, possibly at the instruction of the client. Block 715 can be omitted, as shown by dashed line 720. Depending on the implementation of devices 110, 205, 210, and/or 215 of FIGS. 1-2, devices 110, 205, 210, and/or 215 of FIGS. 1-2 might require a warm reboot or a cold reboot. At block 725, devices 110, 205, 210, and/or 215 of FIGS. 1-2 can activate boot loader update firmware 305 of FIG. 3 from non-volatile memory 145 of FIG. 1.

At block 730 (FIG. 7B), boot loader update firmware 305 of FIG. 3 can determine if boot loader update firmware 305 of FIG. 3 is signed, and at block 735, boot loader update firmware 305 of FIG. 3 can determine if signature 325 of FIG. 3 was generated using authentication key 340 of FIG. 3. In either case, if the test is not satisfied, then at block 740, boot loader update firmware 305 can abort the update of boot loader module 160 of FIG. 1, after which the procedure ends. Otherwise, at block 745, boot loader update firmware 305 of FIG. 3 can copy binary image 320 of FIG. 3 into non-volatile memory 150 of FIG. 1, thereby updating boot loader module 160 of FIG. 1.

At block 750 (FIG. 7C), boot loader update firmware 305 of FIG. 3 can monitor the installation of binary image 320 of FIG. 3 into non-volatile memory 150 of FIG. 1. At block 755, boot loader update firmware 305 of FIG. 3 can determine if the installation of binary image 320 of FIG. 3 into non-volatile memory 150 of FIG. 1 was successful.

Figure 7C:
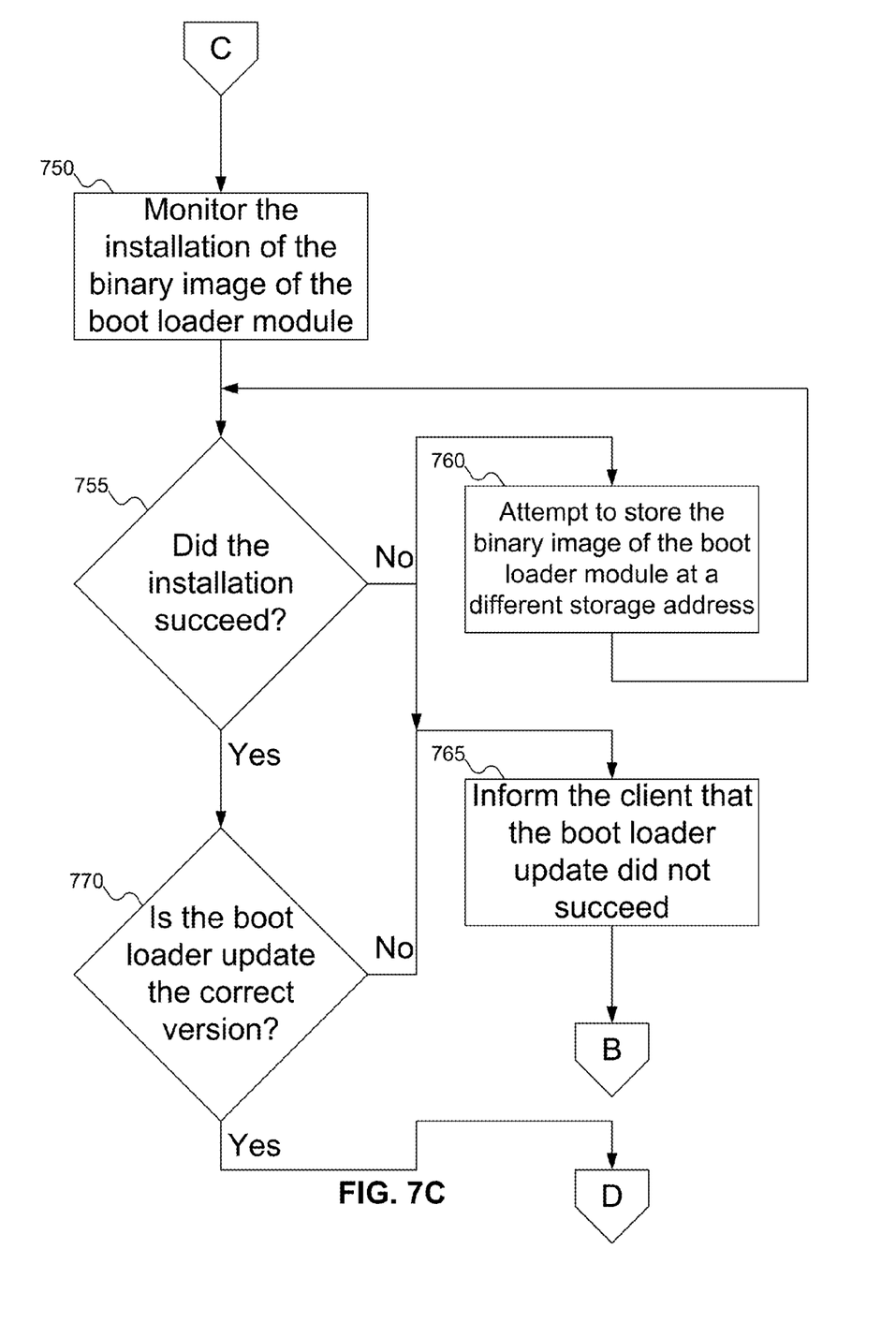
Figure 7D:
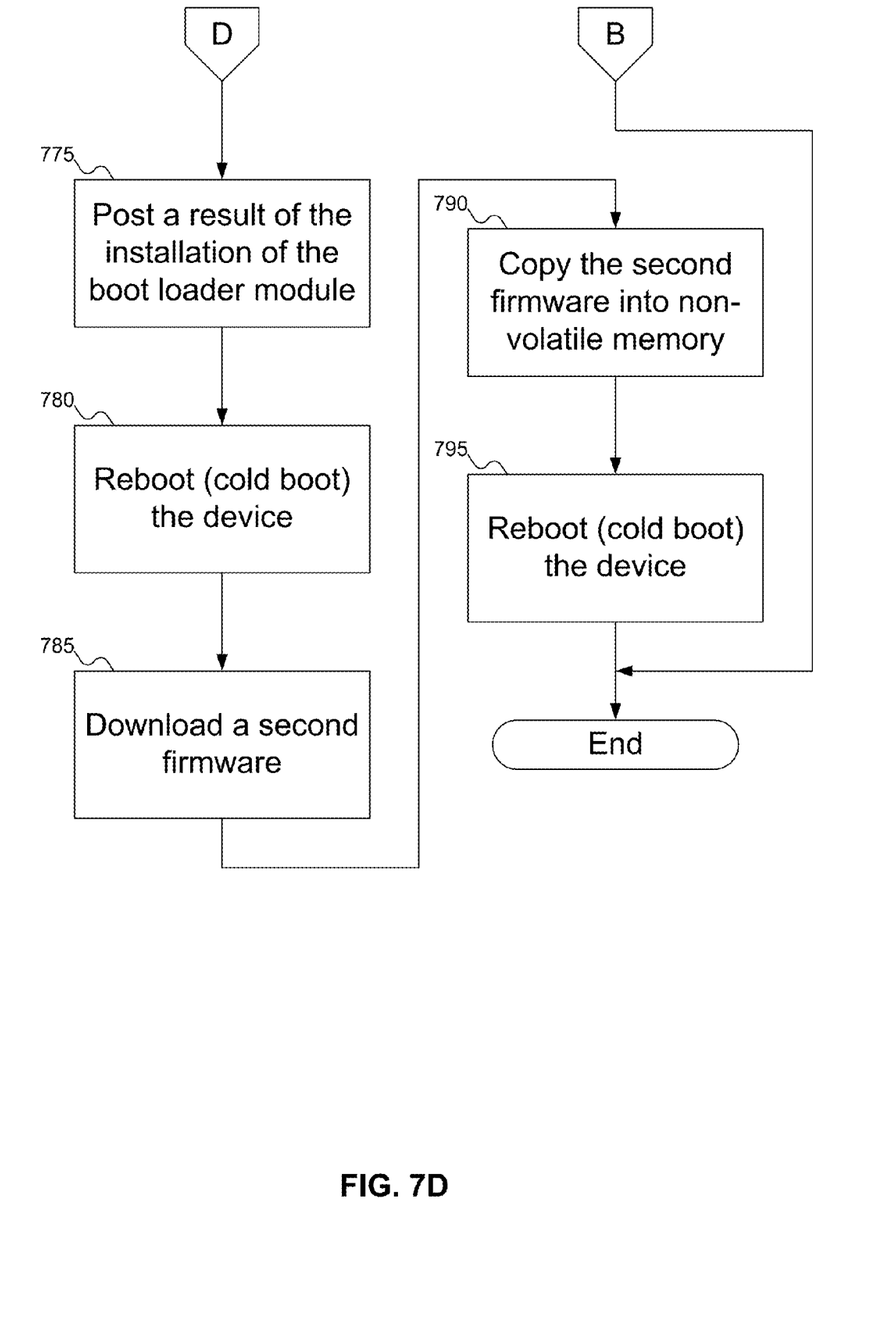

If the installation of binary image 320 of FIG. 3 was not successful, then there are different alternative approaches that can be considered. In one alternative, at block 760 boot loader update firmware 305 of FIG. 3 can attempt to store binary image 320 of FIG. 3 at a different address in non-volatile memory 150 of FIG. 1, after which processing returns to block 755. Attempting to store binary image 320 of FIG. 3 at a different address in non-volatile memory 150 of FIG. 1 can be useful when non-volatile memory 150 of FIG. 1 supports random access, which can occur for example when non-volatile memory 150 of FIG. 1 is flash memory. In another alternative, at block 765, boot loader update firmware 305 of FIG. 3 can inform the client that the update of boot loader module 160 of FIG. 1 did not succeed, after which processing ends.

On the other hand, if the installation of binary image 320 of FIG. 3 was successful, then at block 770, boot loader update firmware 305 of FIG. 3 can determine if version 330 of boot loader module 160 of FIG. 1 (after update) is the correct version of boot loader module 160 of FIG. 1. If not, then processing can continue at block 765 to inform the client that the update of boot loader module 160 of FIG. 1 was not successful.

At block 775 (FIG. 7D), boot loader update firmware 305 of FIG. 3 can post result 405 of FIG. 4 to the client. At block 780, boot loader update firmware 305 of FIG. 3 can reboot devices 110, 205, 210, and/or 215 of FIGS. 1-2. As with block 715 of FIG. 7A, the reboot of devices 110, 205, 210, and/or 215 of FIGS. 1-2 can be a cold boot or a warm boot, depending on devices 110, 205, 210, and/or 215. This reboot can activate updated boot loader module 160 of FIG. 1. At block 785, devices 110, 205, 210, and/or 215 of FIGS. 1-2 can download a second firmware, to update firmware 155 of FIG. 1. At block 790, devices 110, 205, 210, and/or 215 of FIGS. 1-2 can copy the downloaded firmware into non-volatile memory 145 of FIG. 1. At block 795, boot loader update firmware 305 of FIG. 3 can reboot devices 110, 205, 210, and/or 215 of FIGS. 1-2. As with blocks 715 and 780 of FIGS. 7A and 7D, the reboot of devices 110, 205, 210, and/or 215 of FIGS. 1-2 can be a cold boot or a warm boot, depending on devices 110, 205, 210, and/or 215. This reboot can activate updated firmware 155 of FIG. 1.

Embodiments of the inventive concept have several advantages over earlier methods for updating boot loader module 160 of FIG. 1. The client does not have to learn a new tool and method to update boot loader 160 of FIG. 1. By automating the update of boot loader module 160 of FIG. 1, human errors are reduced and boot loader updating is made more reliable. In addition, the update of boot loader module 160 can be performed at the client's side, avoiding the time and expense required to ship devices 110, 205, 210, and/or 215 to the manufacturer or to a servicing facility.

Embodiments of the inventive concept can utilize existing techniques for updating firmware. Again, this simplifies the update of boot loader module 160 of FIG. 1, as the client does not need to learn a new technique to update boot loader module 160 of FIG. 1.

Finally, as the contents and method of updating boot loader module 160 of FIG. 1 is performed automatically using object code, embodiments of the inventive concept avoid disclosing confidential information to the client.

Figure 8:
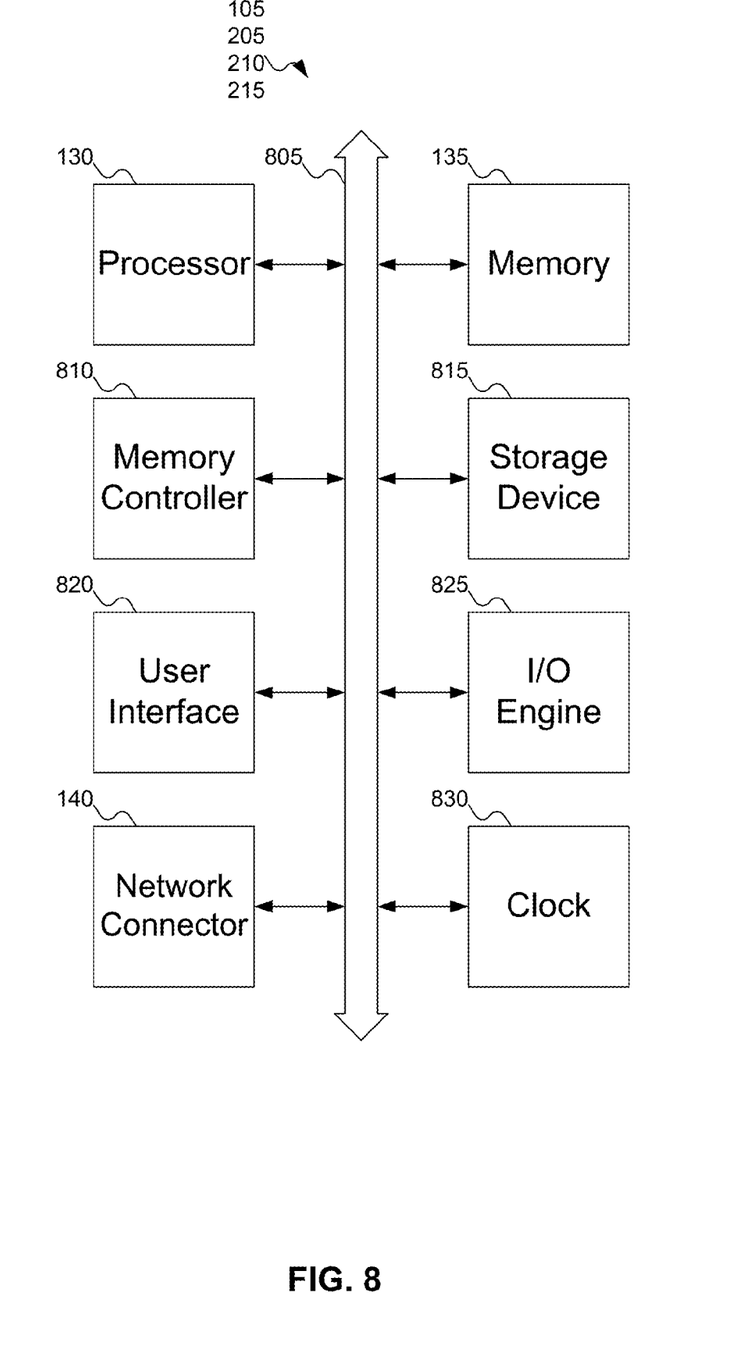
FIG. 8 shows a device for which a field update of the boot loader can be performed, as described above with reference to FIGS. 1-7.

The following discussion is intended to provide a brief, general description of a suitable machine or machines in which certain aspects of the inventive concept can be implemented. Referring to FIG. 8, typically, machine or machines 105, 205, 210, and 215 include system bus 805 to which are attached one or more processors 130, memory 135, e.g., random access memory (RAM), read-only memory (ROM), or other state preserving medium, memory controller 810, storage devices 815, user interface 820, and input/output interface ports that can be managed using input/output engine 825. Machine or machines 105, 205, 210, and 215 can also include network connector 140, which can be, for example, an Ethernet connector. Clock 830 can be used to coordinate the operations of the components connected to system bus 805.

The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Embodiments of the inventive concept can include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments can be modified in arrangement and detail without departing from such principles, and can be combined in any desired manner.

And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept can extend to the following statements, without limitation:

Statement 1. An embodiment of the inventive concept includes a boot loader update firmware (305), comprising:
a first logic (310) to install a first firmware (315) in a first non-volatile memory (145) of a device (110, 205, 210, 215); and
a binary image (320) of a boot loader module (160),
wherein the first firmware (315) is operative to install the binary image (320) of the boot loader module (160) in a second non-volatile memory (150) of the device (110, 205, 210, 215).

Statement 2. An embodiment of the inventive concept includes a boot loader update firmware (305) according to statement 1, wherein the first firmware (315) includes the binary image (320) of the boot loader module (160).

Statement 3. An embodiment of the inventive concept includes a boot loader update firmware (305) according to statement 1, further comprising a second logic (335) to authenticate a signature (325) applied to the boot loader update firmware (305) using an authentication key (340).

Statement 4. An embodiment of the inventive concept includes a boot loader update firmware (305) according to statement 3, wherein the second logic (335) is operative to abort the boot loader update firmware (305) if the second logic (335) cannot authenticate the signature (325).

Statement 5. An embodiment of the inventive concept includes a boot loader update firmware (305) according to statement 3, wherein the authentication key (340) is unique to a client that owns the device (110, 205, 210, 215).

Statement 6. An embodiment of the inventive concept includes a boot loader update firmware (305) according to statement 1, further comprising a third logic (345) to install a second firmware (350) in the first non-volatile memory (145).

Statement 7. An embodiment of the inventive concept includes a boot loader update firmware (305) according to statement 6, wherein the third logic (345) is operative to reboot the device (110, 205, 210, 215) after installing the second firmware (350) in the first non-volatile memory (145).

Statement 8. An embodiment of the inventive concept includes a boot loader update firmware (305) according to statement 1, wherein the first logic (310) is operative to reboot the device (110, 205, 210, 215) after installing the first firmware (315).

Statement 9. An embodiment of the inventive concept includes a boot loader update firmware (305) according to statement 1, wherein the first logic (310) is operative to validate a version (330) of the boot loader module (160) before installing the binary image (320) of the boot loader module (160) in the second non-volatile memory (150).

Statement 10. An embodiment of the inventive concept includes a boot loader update firmware (305) according to statement 1, wherein the first logic (310) is operative to post a result (405) of the installation of the binary image (320) of the boot loader module (160) in the second non-volatile memory (150) of the device (110, 205, 210, 215).

Statement 11. An embodiment of the inventive concept includes a boot loader update firmware (305) according to statement 1, wherein the first non-volatile memory (145) and the second non-volatile memory (150) are the same non-volatile memory (145, 150).

Statement 12. An embodiment of the inventive concept includes a boot loader firmware image build tool (505), comprising:
a binary image (320) of a boot loader module (160);
a firmware (315) logic operative to install the boot loader module (160) in a non-volatile memory of a device (110, 205, 210, 215); and
a compiler (510) to combiner the binary image (320) of the boot loader module (160) and the firmware (315) logic into a boot loader update firmware (305).

Statement 13. An embodiment of the inventive concept includes a boot loader firmware image build tool (505) according to statement 12, wherein the compiler (510) is operative to include the binary image (320) of the boot loader module (160) in the firmware (315).

Statement 14. An embodiment of the inventive concept includes a boot loader firmware image build tool (505) according to statement 12, wherein:
the boot loader firmware image build tool (505) further comprises an authentication key (340); and
the compiler (510) is operative to sign the boot loader update firmware (305) using the authentication key (340).

Statement 15. An embodiment of the inventive concept includes a boot loader firmware image build tool (505) according to statement 14, wherein the authentication key (340) is unique to a client that owns the device (110, 205, 210, 215).

Statement 16. An embodiment of the inventive concept includes a method, comprising:
implementing (605) a boot loader module (160) for a device (110, 205, 210, 215);
generating (610) a binary image (320) of the boot loader module (160); and
combining (615) the binary image (320) of the boot loader module (160) with a first firmware (315) to form a boot loader update firmware (305),
wherein the boot loader update firmware (305) is operative to copy the boot loader module (160) into non-volatile memory on the device (110, 205, 210, 215).

Statement 17. An embodiment of the inventive concept includes a method according to statement 16, further comprising signing (620) the boot loader update firmware (305) using an authentication key (340).

Statement 18. An embodiment of the inventive concept includes a method according to statement 17, wherein signing (620) the boot loader update firmware (305) using an authentication key (340) includes signing (620) the boot loader update firmware (305) with the authentication key (340), wherein the authentication key (340) is unique to a client that owns the device (110, 205, 210, 215).

Statement 19. An embodiment of the inventive concept includes a method according to statement 16, wherein combining (615) the binary image (320) of the boot loader module (160) with a first firmware (315) to form a boot loader update firmware (305) includes combining (615) the binary image (320) of the boot loader module (160) with the first firmware (315) and a second firmware (350), wherein after the boot loader update firmware (305) copies the boot loader module (160) into the non-volatile memory on the device (110, 205, 210, 215), the boot loader update firmware (305) is operative to copy the second firmware (350) into a second non-volatile memory (150) on the device (110, 205, 210, 215).

Statement 20. An embodiment of the inventive concept includes a method according to statement 19, wherein the boot loader update firmware (305) is operative to download a second firmware (350) for the device (110, 205, 210, 215) after the boot loader update firmware (305) copies the boot loader module (160) into the non-volatile memory on the device (110, 205, 210, 215).

Statement 21. An embodiment of the inventive concept includes a method according to statement 16, wherein the first firmware (315) is operative to verify a version (330) of the boot loader module (160) before copying the binary image (320) of the boot loader module (160) into the non-volatile memory.

Statement 22. An embodiment of the inventive concept includes a method, comprising:

copying (710) a boot loader update firmware (305) into a first non-volatile memory (145) on a device (110, 205, 210, 215);

activating (725) the boot loader update firmware (305);

using (745) the boot loader update firmware (305) to copy a binary image (320) of a boot loader module (160) into a second non-volatile memory (150); and rebooting (780) the device (110, 205, 210, 215) to use the boot loader module (160).

Statement 23. An embodiment of the inventive concept includes a method according to statement 22, further comprising downloading (705) the boot loader update firmware (305) to the device (110, 205, 210, 215).

Statement 24. An embodiment of the inventive concept includes a method according to statement 22, wherein activating (725) the boot loader update firmware (305) includes rebooting (715) the device (110, 205, 210, 215).

Statement 25. An embodiment of the inventive concept includes a method according to statement 24, wherein rebooting (715) the device (110, 205, 210, 215) includes cold-booting (715) the device (110, 205, 210, 215).

Statement 26. An embodiment of the inventive concept includes a method according to statement 22, wherein using (745) the boot loader update firmware (305) includes verifying (730, 735) that the boot loader update firmware (305) is signed using a recognized authentication key (340).

Statement 27. An embodiment of the inventive concept includes a method according to statement 26, further comprising, if the boot loader update firmware (305) is not signed using the recognized authentication key (340), aborting (740) execution of the boot loader update firmware (305).

Statement 28. An embodiment of the inventive concept includes a method according to statement 22, wherein using (745) the boot loader update firmware (305) to copy a binary image (320) of a boot loader module (160) into a second non-volatile memory (150) includes verifying (770) a version (330) of the boot loader module (160) before copying the binary image (320) of the boot loader module (160) into the second non-volatile memory (150).

Statement 29. An embodiment of the inventive concept includes a method according to statement 22, wherein using (745) the boot loader update firmware (305) to copy a binary image (320) of a boot loader module (160) into a second non-volatile memory (150) includes monitoring (750) an installation of the boot loader module (160) in the second non-volatile memory (150).

Statement 30. An embodiment of the inventive concept includes a method according to statement 29, wherein monitoring (750) the installation of the boot loader module (160) in the second non-volatile memory (150) includes informing (765) a user of an error condition if the installation of the boot loader module (160) in the second non-volatile memory (150) fails.

Statement 31. An embodiment of the inventive concept includes a method according to statement 29, wherein monitoring (750) the installation of the boot loader module (160) in the second non-volatile memory (150) includes verifying (770) a version (330) number the boot loader module (160) after installation in the second non-volatile memory (150).

Statement 32. An embodiment of the inventive concept includes a method according to statement 29, wherein monitoring (750) the installation of the boot loader module (160) in the second non-volatile memory (150) includes changing (760) a storage address of the boot loader module (160) in the second non-volatile memory (150).

Statement 33. An embodiment of the inventive concept includes a method according to statement 29, wherein monitoring (750) the installation of the boot loader module (160) in the second non-volatile memory (150) includes posting (775) a result (405) of the installation of the boot loader module (160) in the second non-volatile memory (150).

Statement 34. An embodiment of the inventive concept includes a method according to statement 22, further comprising:

copying (790) a firmware (315) into the first non-volatile memory (145) on the device (110, 205, 210, 215); and rebooting (795) the device (110, 205, 210, 215) to use the firmware (315).

Statement 35. An embodiment of the inventive concept includes a method according to statement 34, further comprising downloading (785) the firmware (315) to the device (110, 205, 210, 215).

Statement 36. An embodiment of the inventive concept includes a method according to statement 34, wherein rebooting (795) the device (110, 205, 210, 215) a second time includes cold-booting (795) the device (110, 205, 210, 215).

Statement 37. An embodiment of the inventive concept includes a method according to statement 34, wherein rebooting (780) the device (110, 205, 210, 215) to use the boot loader module (160) includes rebooting (795) the device (110, 205, 210, 215) to use the firmware (315).

Statement 38. An embodiment of the inventive concept includes a method according to statement 22, wherein using (745) the boot loader update firmware (305) to copy a binary image (320) of a boot loader module (160) into a second non-volatile memory (150) includes using (745) the boot loader update firmware (305) to copy a binary image (320) of a boot loader module (160) into the first non-volatile memory (145).

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A boot loader update firmware stored on a hardware storage device, comprising:
   a first logic to install a first firmware in a first non-volatile memory of a device, the first non-volatile memory of the device including a first chip of the device,
   wherein the first firmware includes a binary image of a boot loader module, and
   wherein the first firmware is operative to install the binary image of the boot loader module in a second non-volatile memory of the device, the second non-volatile memory of the device including a second chip of the device;
   a second logic to authenticate a signature applied to the boot loader update firmware using an authentication key; and
   a third logic to install a second firmware in the first non-volatile memory of the device after the first firmware has installed the binary image of the boot loader module in the second non-volatile memory of the device.

2. A boot loader update firmware according to claim 1, wherein the second logic is operative to abort the boot loader update firmware if the second logic cannot authenticate the signature applied to the boot loader update firmware.

3. A boot loader update firmware according to claim 1, wherein the authentication key is unique to a client that owns the device.

4. A boot loader update firmware according to claim 1, wherein the third logic is operative to reboot the device after installing the second firmware in the first non-volatile memory of the device.

5. A boot loader update firmware according to claim 1, wherein the first logic is operative to reboot the device after installing the first firmware in the first non-volatile memory of the device.

6. A boot loader update firmware according to claim 1, wherein the first logic is operative to validate a version of the boot loader module before copying the binary image of the boot loader module into the second non-volatile memory of the device and installing the copied binary image of the boot loader module in the second non-volatile memory of the device.

7. A boot loader update firmware according to claim 1, wherein the first logic is operative to post a result of the installation of the binary image of the boot loader module in the second non-volatile memory of the device.

8. A method, comprising:
   implementing a boot loader module for a device;
   generating a binary image of the boot loader module; and
   combining the binary image of the boot loader module with a first firmware to form a boot loader update firmware,
   wherein the boot loader update firmware is operative to copy the binary image of the boot loader module from a second non-volatile memory of the device into a first non-volatile memory of the device, the first non-volatile memory of the device including a first chip of the device and the second non-volatile memory of the device including a second chip of the device,
   wherein the first firmware is operative to verify a version of the boot loader module before copying the binary image of the boot loader module into the first non-volatile memory of the device, and
   wherein after the boot loader update firmware copies the binary image of the boot loader module into the first non-volatile memory of the device, the boot loader update firmware is operative to copy a second firmware into the second non-volatile memory of the device.

9. A method according to claim 8, further comprising signing the boot loader update firmware using an authentication key.

10. A method according to claim 9, wherein signing the boot loader update firmware using the authentication key includes signing the boot loader update firmware with the authentication key, and wherein the authentication key is unique to a client that owns the device.

11. A method according to claim 8, wherein combining the binary image of the boot loader module with the first firmware to form the boot loader update firmware includes combining the binary image of the boot loader module with the first firmware and the second firmware.

12. A method according to claim 11, wherein the boot loader update firmware is operative to download the second firmware for the device after the boot loader update firmware copies the binary image of the boot loader module into the first non-volatile memory of the device.

13. A method, comprising:
   copying a boot loader update firmware into a first non-volatile memory of a device, the boot loader update firmware including a binary image of a boot loader module and a first firmware, the first non-volatile memory of the device including a first chip of the device;
   activating the boot loader update firmware;
   using the boot loader update firmware in the first non-volatile memory of the device to verify that the boot loader update firmware is signed using a recognized authentication key and copy the binary image of the boot loader module into a second non-volatile memory of the device, the second non-volatile memory of the device including a second chip of the device;
   after the boot loader update firmware copies the binary image of the boot loader module into the second non-volatile memory of the device, using the boot loader update firmware in the first non-volatile memory of the device to copy a second firmware into the first non-volatile memory of the device; and
   rebooting the device to use the boot loader module.

14. A method according to claim 13, wherein using the boot loader update firmware in the first non-volatile memory of the device to copy the binary image of the boot loader module into the second non-volatile memory of the device includes monitoring an installation of the boot loader module in the second non-volatile memory of the device.

15. A method according to claim 14, wherein monitoring the installation of the boot loader module in the second non-volatile memory of the device includes informing a user of an error condition if the installation of the boot loader module in the second non-volatile memory of the device fails.

* * * * *